Figure 1:
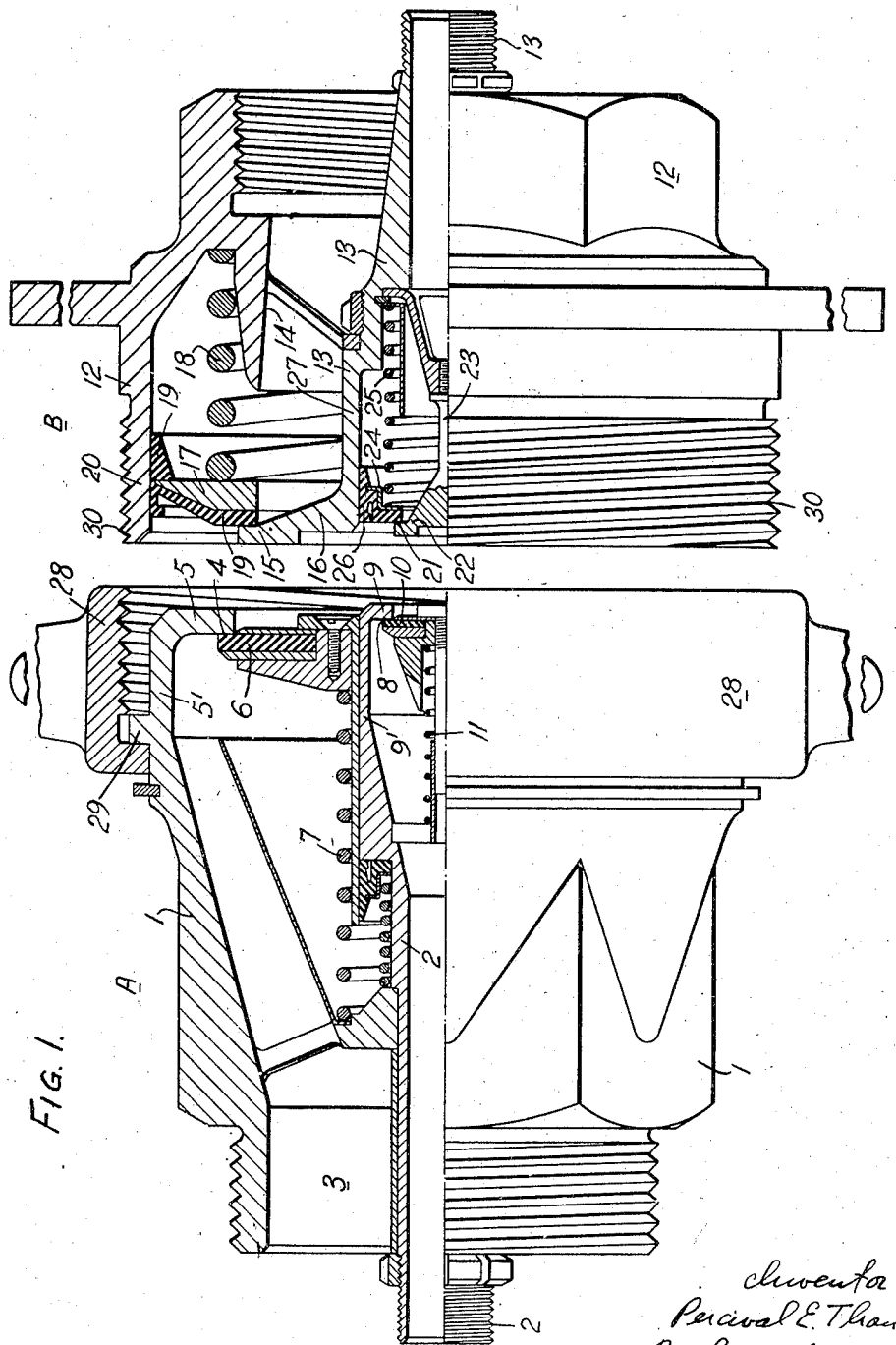

May 31, 1949. P. E. THOMAS 2,471,798
SELF-CLOSING PIPE COUPLINGS
Filed May 9, 1947 2 Sheets-Sheet 1

Inventor:
Percival E. Thomas,
By his attorneys:
Baldwin & Wight

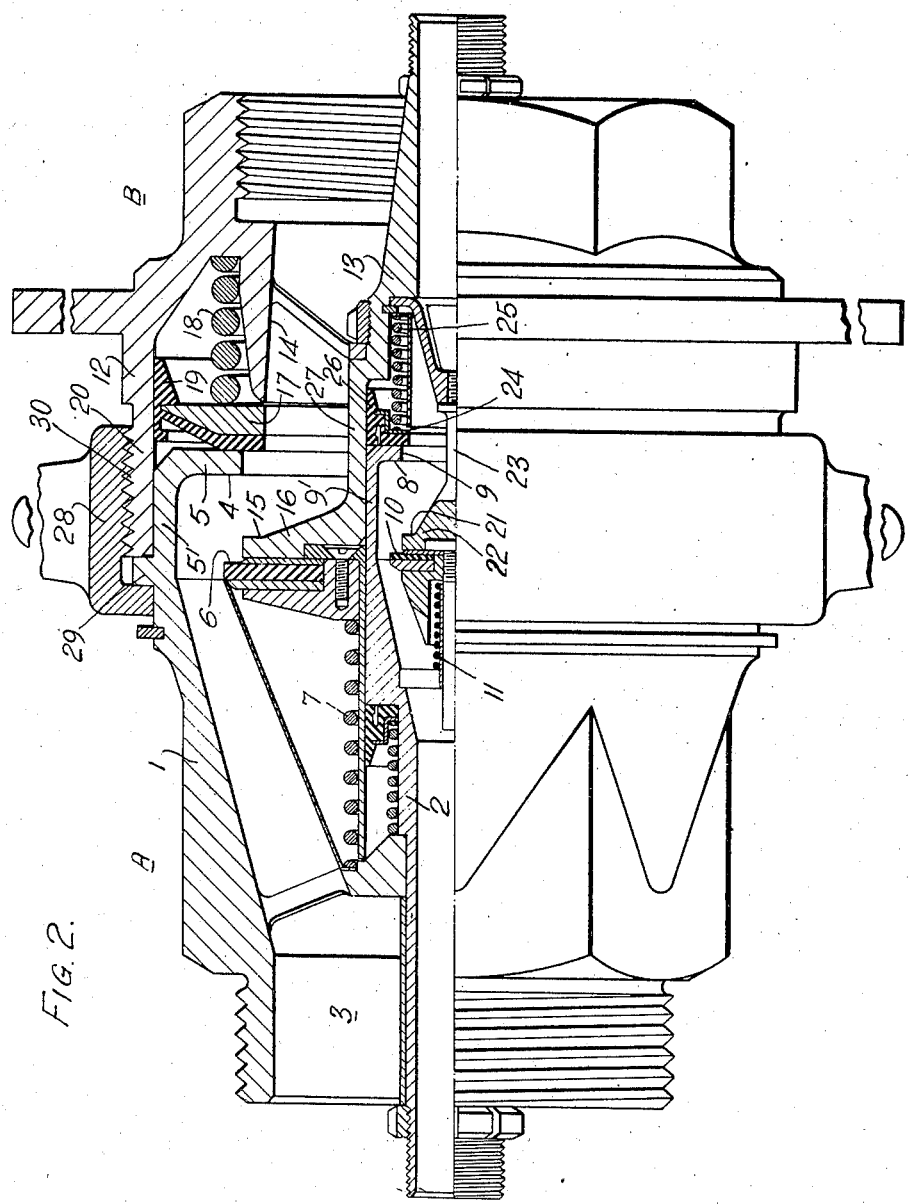

Patented May 31, 1949

2,471,798

UNITED STATES PATENT OFFICE 2,471,798

SELF-CLOSING PIPE COUPLING

Percival Edward Thomas, London, England, assignor to Sterling Industries Limited, London, England Application May 9, 1947, Serial No. 746,907
In Great Britain April 12, 1946

Section 1, Public Law 690, August 8, 1946
Patent expires April 12, 1966

3 Claims. (Cl. 284—19)

This invention relates to pipe couplings of the type which are so arranged that on the coupling being broken the ends of the pipes are automatically closed to prevent the escape of the medium conveyed by the pipe line and on the connection being made the pipe ends are automatically opened to one another to permit the flow of medium through the coupling.

More particularly the present invention relates to coupling structures for simultaneously coupling a number of pipe lines to convey different mediums.

According to the main feature of the present invention a pipe coupling comprises two unitary coupling components each formed with a plurality of concentric passages adapted respectively for connection to the various parts of a multiple pipe line and each component has a plurality of self-closing valves one for each of the passages, the plurality of valves in the two components being arranged to be automatically opened when the components are presented to one another.

The concentric grouping of the passages affords a convenient disposition, for in this case there would be a central passage and an annular passage or passages disposed about it, the various passages being closed by valves also concentrically arranged about one another.

Each valve arrangement in each component would consist in essence of two parts, one fixed and forming a valve seating and the other movable; it is in general preferable that the fixed part of a valve in one coupling component be adapted to engage and displace the movable valve part for a related passage in the other component for the purpose of effecting automatic opening of the valves.

The two components would have sealing devices which come into operation to isolate one passage from another concentric passage as or just before the corresponding valve parts in the two coupling components engage for the purpose of effecting automatic opening when the coupling components are further pressed into one another.

The engaging end faces of the two coupling parts (including of course the engaging surfaces of the related fixed and movable valve parts) would be so formed that there are substantially no free spaces in which when the coupling is made air can be trapped and from which the trapped air can pass into the passages when the valves are opened; this would also operate to prevent the loss of medium when the coupling is broken.

The invention is illustrated in the accompanying drawings in which Figure 1 is a sectional elevation showing the two parts of a coupling detached from one another and Figure 2 is a similar view of the two parts coupled together.

Referring to the drawings, the two parts are indicated generically at A, B respectively, the part A constituting a spigot part to enter the other or socket part B.

The part A comprises an outer casing or body 1 which supports concentrically within it a central tubular component 2; the annulus 3 between the body 1 and the tube 2 constitutes one flow passage and the bore of the tube 2 constitutes the other flow passage. The annulus 3 terminates in a fixed valve seating 4 constituted by an inturned flange 5 at one end of a spigot 5' on the body 1 and this valve seating 4 is disposed to be engaged by a mobile valve 6 having a resilient facing which is urged by a spring 7 towards its seating 4 to close that annulus 3. Similarly the bore of the central tubular component 2 terminates in a fixed valve seating 8 constituted by an inturned flange 9 on a spigot part 9' of that component and this valve seating 8 is disposed to be engaged by a mobile valve 10 having a resilient facing urged by a spring 11 towards its seating 8.

The part B also comprises an outer casing or body 12 which supports concentrically within it a central tubular component 13; the annulus 14 between the body 12 and the component 13 constitutes one flow passage and the bore of the component 13 affords the other flow passage. The annulus 14 terminates in a fixed valve seating 15 formed on a flange extension 16 of the tubular component 13 and this seating is disposed to be engaged by a mobile valve 17 spring urged to engagement with its seating 15 by a spring 18. This mobile valve 17 includes a cup packing 19 which not only operates as a facing to the valve 17 to constitute a resilient packing between the valve 17 and its seating 15 but also extends out into sealing and sliding engagement with the cylindrical wall of a socket part 20 in the body 12, this socket part receiving a spigot part 5' of the part A. Similarly the central flow passage terminates in a fixed valve seating 21 on a flange extension 22 on a component 23 secured to the component 13; this seating is disposed to be engaged by a mobile valve 24 spring urged by a spring 25 towards its seating 21; this mobile valve 24 also includes a cup packing 26 which affords a resilient packing between the valve 24 and its seating 21 and also extends out into sealing and sliding engagement with a socket part 27 to receive the spigot part 9' of the part A.

The body 1 of the part A is fitted with a union nut 28 engaging behind a flange 29 and screwed to engage a thread 30 on the socket part 20 of the part B, the nut enabling the two coupling parts to be presented to one another and then drawn into one another to effect coupling.

When the parts A and B are uncoupled, the springs 7 and 11 of the part A press their mobile valves 6 and 10 into engagement with their fixed seatings 4 and 8 and so close the two flow passages. The springs 18 and 25 of the part B also press the mobile valves 17 and 24 into engagement with their seatings 15 and 21 and so close the two flow passages, it being noted that the cup packings 19 and 26 are constantly pressed out into sealing engagement with the bore of the socket parts 20, 27.

When now the two parts A and B of the coupling are presented to one another so that the spigot parts 5', 9' of the part A enter the socket parts 20, 27 of the part B, the leading faces of the valve seating flanges 5, 9 of the part A first engage the packings 19 and 26 of the mobile valves of part B and make a seal with them; the forward faces of the fixed valve parts 16 and 22 of the part B engage the mobile valve parts 6 and 10 of the part A.

By now operating the union nut 29, the spigot parts 5', 9' are drawn into the socket parts and as a result the fixed valve members 5, 9 of one part A displace the mobile valve members 17, 24 of the other part B and at the same time the fixed valve members 16, 20 of the part B displace the mobile valve members 6, 10 of the part A. Thus in the single operation of presenting the two coupling parts to one another, the two flow passages in the two parts are opened to one another to establish flow connections through the conjoint duplex coupling. When the coupling is broken, the fixed valve members of the one coupling part allow the mobile valves of the other part to be moved by their return springs into sealing engagement with their fixed valve parts and then the engagement between the flanges 5 and 9 of the part A and the packing 19, 26 of the part B is broken.

The multiple coupling of this invention is capable of wide application as for example, in re-fuelling craft at full-stop, one flow passage being utilised to effect the feed of liquid fuel and the other the return of vapour.

If it be required to branch one of the passages away from the other, then one of the coupling components made as described would have a branch passage which could terminate in a single self-closing valve arrangement to enable connection to be made to a single branch line.

What I claim is:

1. A pipe coupling comprising a first unitary component providing a plurality of concentric flow passages and concentric self-closing valve devices to close the terminals of the passages, a second unitary component providing a corresponding plurality of concentric flow passages and concentric self-closing valve devices to close the terminals of those passages, and means to secure the two components together and to open the various valve devices when the coupling is made.

2. A pipe coupling comprising two components each having a plurality of concentric flow passages terminating in a fixed valve seating, a mobile valve for each seating and biased to engage its seating, the mobile valves and seatings of the one component being in a concentric grouping to correspond to the grouping of the mobile valves and seatings of the other component, and the various fixed valve seatings being formed to engage and displace the mobile valves, and means to secure the two components together whereby the fixed seatings displace and open automatically the mobile valves.

3. A pipe coupling comprising two body components each having a plurality of concentric flow passages, a passage in one component terminating in a spigot to enter a socket in the other component, the various spigots terminating in fixed annular valve seatings, a mobile valve to engage the annular seating of the central flow passage in the central spigot, an annular mobile valve to engage the annular seating of the outer flow passage in the outer spigot, spring means urging the valves to engage their seatings, a fixed valve seating disposed centrally within each socket part, an annular mobile valve to engage each fixed valve seating in each socket part, each last mentioned mobile valve including a cup-packing in sliding and sealing engagement with its socket, spring means urging said last mentioned valves to engage their fixed seatings, the fixed valve seating of the one part being opposed to the mobile valves of the other part, and means to draw the spigots of the one component into the sockets of the other component.

PERCIVAL EDWARD THOMAS.

REFERENCES CITED

The following references are of record in the file of this patent:

UNITED STATES PATENTS

| Number | Name | Date |
|---|---|---|
| 2,309,890 | Fisher | Feb. 2, 1943 |
| 2,310,073 | Greig | Feb. 2, 1943 |